United States Patent [19]

Siems et al.

[11] Patent Number: 5,058,080
[45] Date of Patent: Oct. 15, 1991

[54] MULTIPLE TRANSMISSION PATH SEISMIC TELEMETERING SYSTEM

[75] Inventors: Lee E. Siems, Richmond; Marvin K. Amerine, Lake Jackson; Loring C. Chien; William P. Vorheier, both of Houston, all of Tex.

[73] Assignee: Western Atlas International, Inc., Houston, Tex.

[21] Appl. No.: 280,097

[22] Filed: Dec. 5, 1988

[51] Int. Cl.$^5$ .............................................. G01V 1/22
[52] U.S. Cl. ..................................... 367/79; 367/20; 340/870.14
[58] Field of Search ...................... 367/20, 21, 76, 78, 367/154, 79; 340/870.13, 870.21, 870.14; 370/77, 103, 105; 375/107

[56] References Cited

U.S. PATENT DOCUMENTS

| | | | |
|---|---|---|---|
| 3,436,722 | 4/1969 | Strange | 367/22 |
| 3,441,902 | 4/1969 | Savit | 367/22 |
| 3,873,961 | 3/1975 | Lee et al. | 375/107 |
| 3,996,553 | 12/1976 | Siems et al. | 367/79 |
| 4,023,140 | 5/1977 | Siems et al. | 367/79 |
| 4,072,923 | 2/1978 | Siems et al. | 367/6 |
| 4,092,629 | 5/1978 | Siems et al. | 367/79 |
| 4,117,448 | 9/1978 | Siems | 367/79 |
| 4,398,271 | 8/1983 | Cretin et al. | 367/20 |
| 4,509,170 | 4/1985 | Hollinger et al. | 367/79 |
| 4,523,191 | 6/1985 | Cretin et al. | 367/20 |
| 4,616,349 | 10/1986 | Shirley | 367/21 |
| 4,628,493 | 12/1986 | Nelson et al. | 367/79 |
| 4,635,237 | 1/1987 | Benestad et al. | 367/20 |
| 4,639,729 | 1/1987 | Savit | 340/870.13 |
| 4,787,069 | 11/1988 | Beauducel et al. | 367/21 |

Primary Examiner—Ian J. Lobo
Attorney, Agent, or Firm—E. Eugene Thigpen

[57] ABSTRACT

In a marine seismic data acquisition system, a plurality of seismic data transmission paths are utilized to conduct seismic data to a central recording unit from seismic data acquisition modules positioned along the length of cable. Signals from a plurality of data acquisition modules are applied to each of the transmission paths. Data acquisition modules which apply seismic signals to a given transmission path may be spaced and substantially uniform distances along the length of the cable and may be interspersed with data acquisition modules which apply seismic data to each of the other transmission paths. The operation of the data acquisition modules is synchronized by means of a signal transmitted continually from a central recording unit. Each section of the cable includes a plurality of remote units distributed along the cable section for detecting seismic signal. Each section includes a data acquisition module which receives command signals from a central recording unit and which receives seismic data signals from the remote units and transmits seismic data signals to the central recording unit.

32 Claims, 9 Drawing Sheets

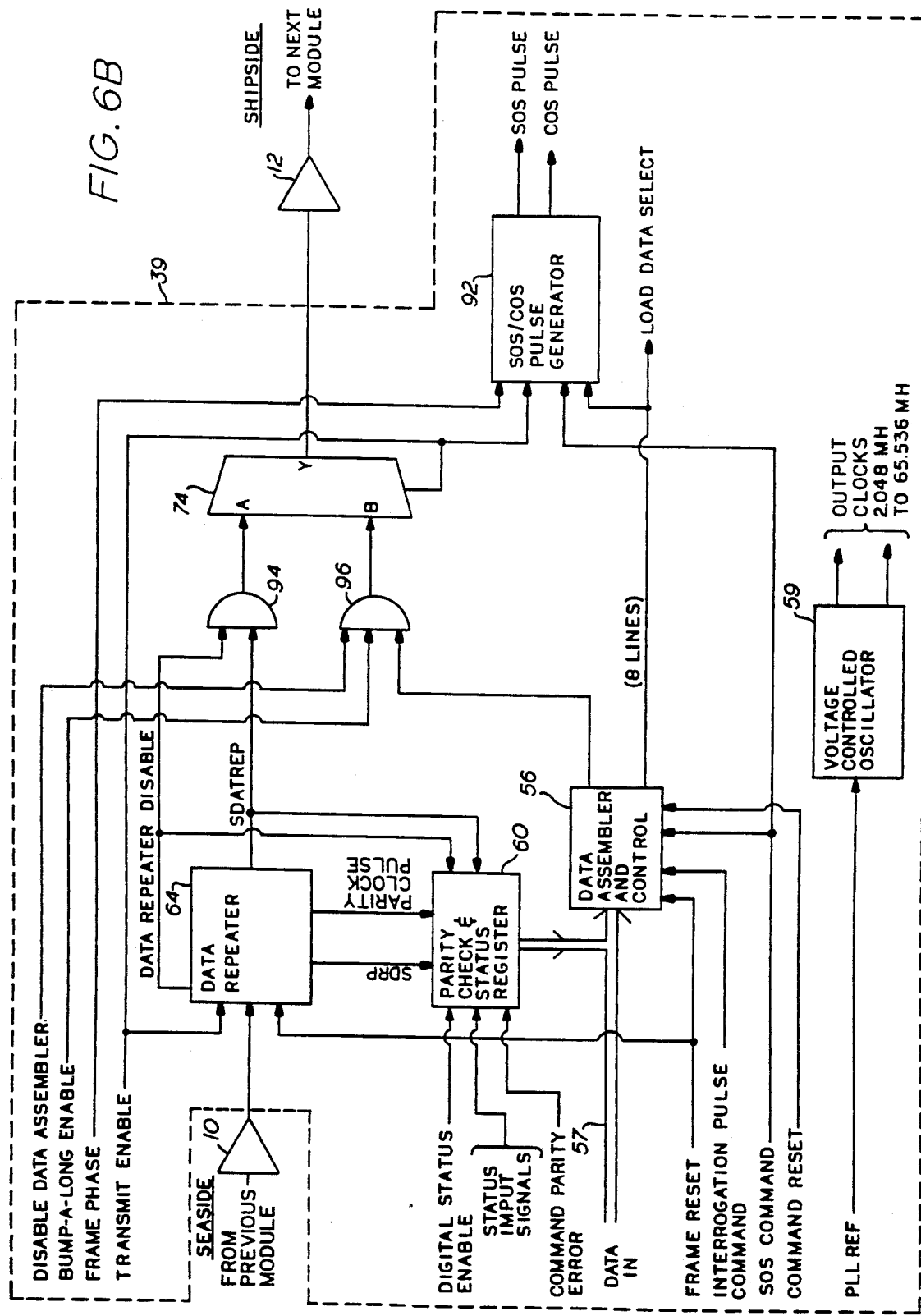

MULTIPLE TRANSMISSION PATH SEISMIC TELEMETERING SYSTEM

BACKGROUND OF THE INVENTION

1. Field of the Invention

This invention relates to a telemetry system as applied particularly to seismographic exploration.

2. Description of the Prior Art

In seismic exploration, acoustic signals are injected into the earth. The acoustic signals radiate downwardly and are reflected from subsurface formations. The reflected acoustic signals then return to the earth's surface where they are detected by seismic sensors. In marine seismic operations, the seismic sensors are normally included in a cable which may typically extend for more than three miles behind the towing vessel. In the past, it was common to run a separate wire from each sensor, or group of sensors, to the recording apparatus located on the vessel.

U.S. Pat. No. 3,990,036, issued to Savit on Nov. 2, 1986 shows a seismic data telemetry system which utilizes a single data transmission path. A polling signal is transmitted over a single telemetry channel to each sensor. Upon receipt of the polling signal, each sensor in turn transmits data over the same telemetry channel to a recording device. The time delay due to polling signal propagation between successive sensors provides a time window during which each sensor can transmit data.

U.S. Pat. No. 3,996,553 and U.S. Pat. No. 4,023,140 show a system in which a first interrogation signal is transmitted from a central signal processor to data acquisition units on a first interrogation channel. A second interrogation signal is transmitted from the central signal processor on a second interrogation channel at a time which is different from the transmission time of the first interrogation signal. Because the signal propagation velocity is different in the two interrogation channels, the transmission timing may be selected so that the two interrogation pulses will arrive simultaneously at a selected data acquisition unit to initiate transmission of data on a data channel. By this means, each data acquisition unit is commanded to transmit data on the data transmission channel so that the data is time division multiplexed onto the data channel.

A primary disadvantage of telemetering systems known to the prior art is the limited amount of data that can be retrieved.

SUMMARY OF THE INVENTION

The invention is a marine seismic data acquisition system. In a particular embodiment of the invention, a plurality of seismic data transmission paths are utilized to transmit seismic data to a central recording unit from seismic data acquisition modules positioned along the length of a cable. Signals from a plurality of data acquisition modules are applied to each of the transmission paths. Data acquisition modules which apply seismic signals to a given transmission path may be spaced at substantially uniform distances along the length of the cable and may be interspersed with data acquisition modules which apply seismic data to each of the other transmission paths.

In another embodiment of the invention, the operation of each data module is time synchronized by means of a signal transmitted continually from a central recording unit. Delta modulation encoders may be utilized to convert detected seismic signals to digital data.

In another embodiment of the invention, a plurality of units are distributed along each section of the cable for detecting seismic signals and converting the signals to digital data. This digital data from each cable section may be transferred to a data acquisition module by means of a shift register extending through the distributed units.

In another embodiment of the invention, a digital test signal may be transmitted to the data acquisition module. This digital test signal as well as a corresponding analog signal derived therefrom may be utilized to test the cable operations. A number of test modes may be utilized to assist in determining the source of possible errors.

BRIEF DESCRIPTION OF THE DRAWINGS

FIGS. 6A, 6B and 6C show a more detailed diagram of a data acquisition module.

DESCRIPTION OF THE PREFERRED EMBODIMENT

Figure 1:
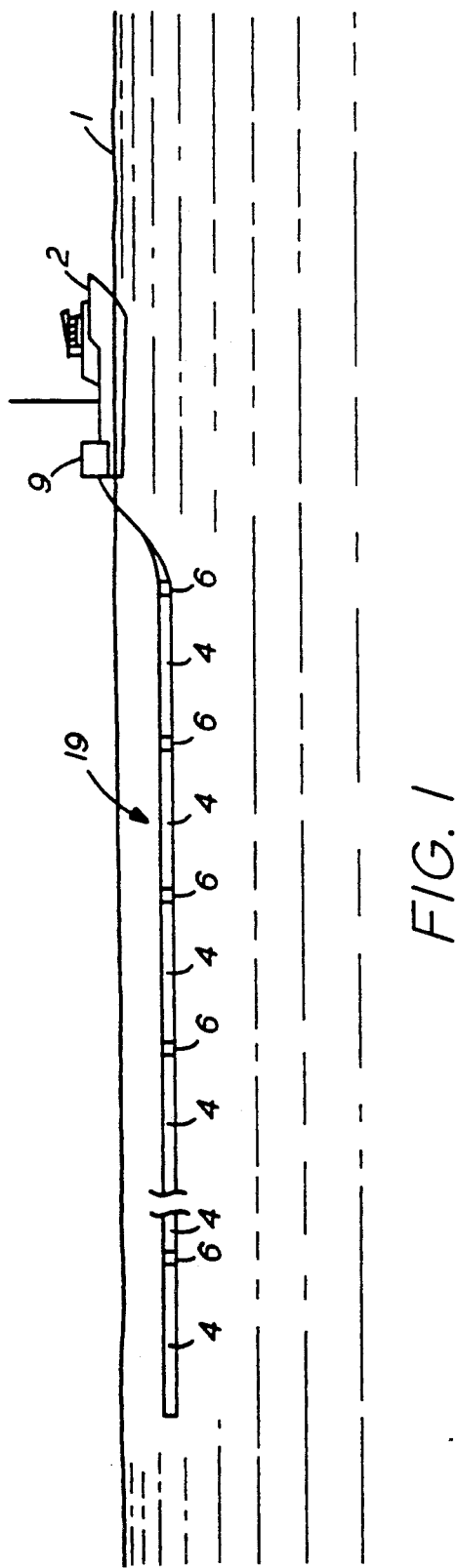
FIG. 1 shows a seismic vessel towing a seismic cable according to the present invention through a body of water.
Figure 2:
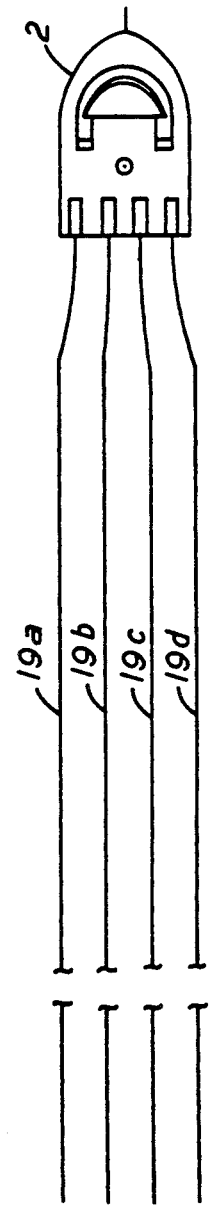
FIG. 2 shows the deployment of a plurality of cables according to the invention.

FIG. 1 shows a vessel 2 pulling a marine seismic cable 19 through a body of water 1. In the preferred embodiment of the invention, the cable comprises a plurality of sections 4, each including a module 6 at the end of the section nearest to the vessel. In a preferred embodiment of the invention, each cable section may be about 100 meters long. In a preferred embodiment, eight marine remote units (18a–18h) are distributed in each cable section, with each marine remote unit including circuits for testing and obtaining data from two hydrophone arrays comprising series-parallel connected piezo-electric pressure transducers. In a particular embodiment of the invention, a plurality of seismic streamer cables may be utilized, such as the four cables designated as 19a–19d shown in FIG. 2.

Figure 3:
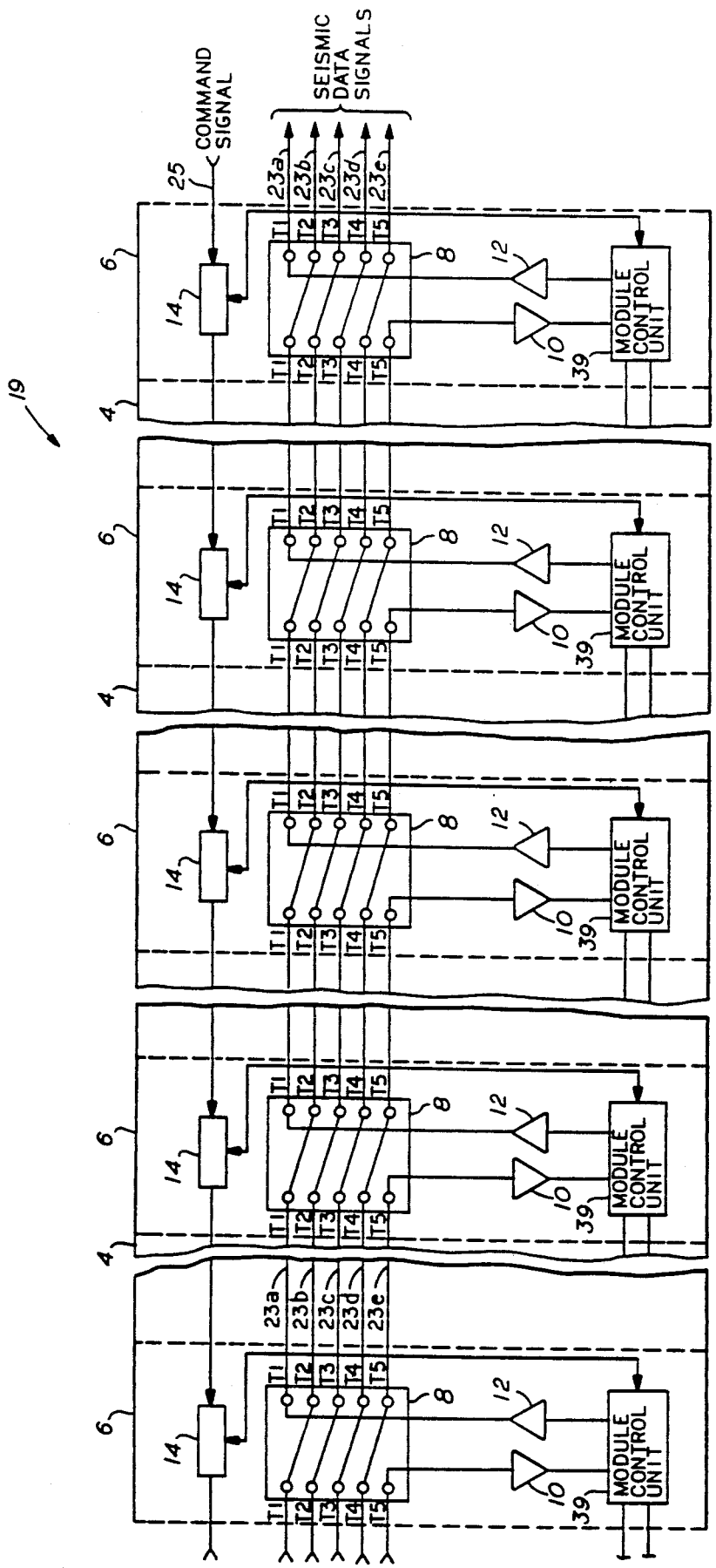
FIG. 3 shows a diagram of several acquisition modules to illustrate the seismic data transmission path.

In a preferred embodiment of the invention, command signals are transmitted from the recording and control system 9 (sometimes referred to hereinafter as a central recording unit) on board the vessel 2 to the modules 6 in the cable 19 on a single twisted shielded pair of electrical conductors. FIG. 3 illustrates a portion of the cable 19 which includes five cable sections. As shown in FIG. 3, command signals are transmitted on the twisted shielded pair 25 to buffer 14 included in the module 6 nearest to the towing vessel. The buffer 14 then retransmits the command signals to the next module along the cable which then transmits the signals to the next module and so on. When the command signal detected by a module is an interrogation signal, seismic data is then transmitted toward the vessel on an optical fiber. The preferred embodiment of the invention utilizes five optical fiber transmission paths (23a-23e), with each module inserting its seismic data onto one of the five optical fiber paths.

Use of a plurality of transmission paths enables larger quantities of data to be transmitted from the streamer cable modules to the recording and control system onboard the vessel. As shown in FIG. 3, in each module five optical fiber conductors are connected to input terminals T1 through T5 of connector 8. In a preferred embodiment of the invention, connector 8 may be a graded index beam lens connector. Four of these input conductors are connected straight through to output terminals of the connector 8, but offset by one connector position, with input terminal T1 being connected to output terminal T2, input terminal T2 connected to output terminal T3, input terminal T3 being connected to output terminal T4, and input terminal T4 connected to output terminal T5. In accordance with the preferred embodiment of the invention, the optical data entering input terminal T5 is converted to an electrical signal in optical to electrical converter 10, the output of which is applied to module control unit 39. As discussed further hereinafter, module control unit 39 checks the incoming data for parity errors, adds local seismic data from the marine remote units 18a-18h associated with the module, and applies the local data as well as the data received by optical to electrical converter 10 to electrical to optical converter 12. The output of electrical to optical converter 12 is then connected to output terminal T1 of connector 8. As illustrated in FIG. 3, seismic data is inserted onto a given one of the optical transmission paths in every fifth module. The manner of forming the connectors, however, allows each of the modules and cable sections to be identical.

Figure 4:
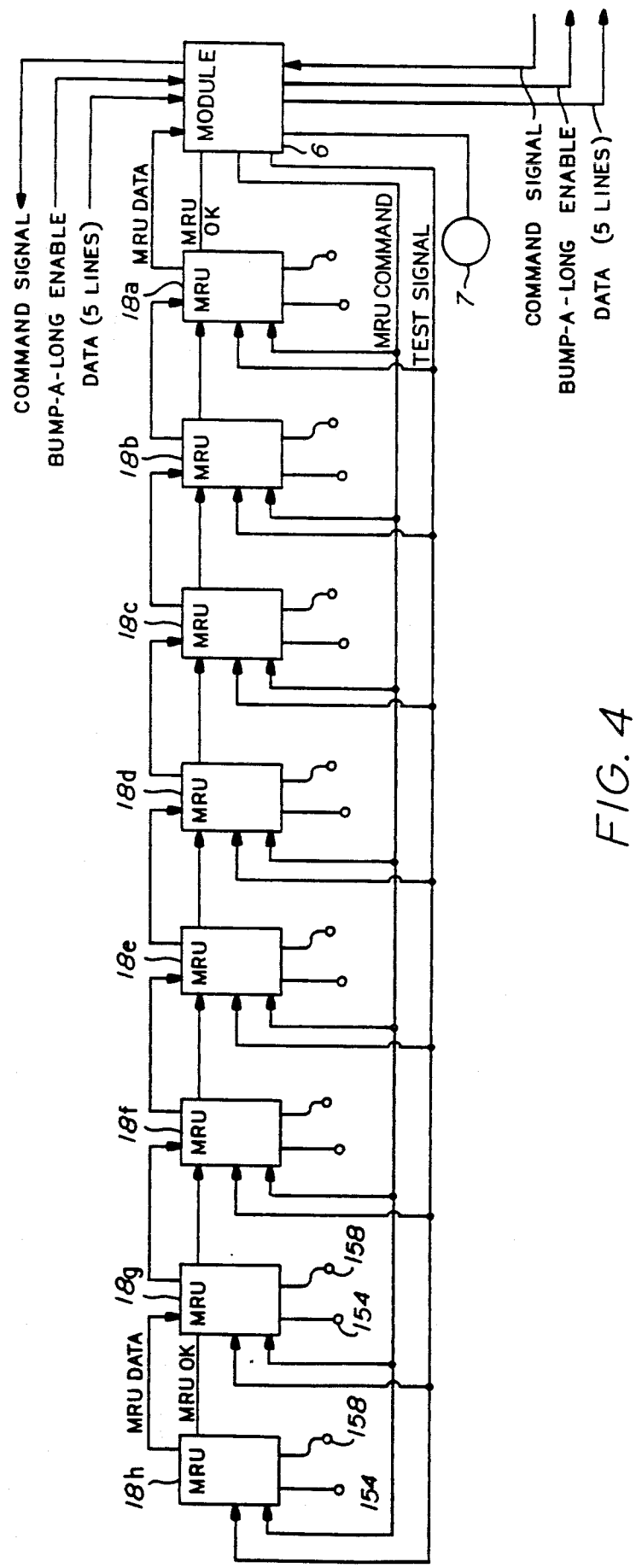
FIG. 4 shows a diagram of the data acquisition module and distributed units for collecting seismic data included within a single cable section.
Figure 5A:
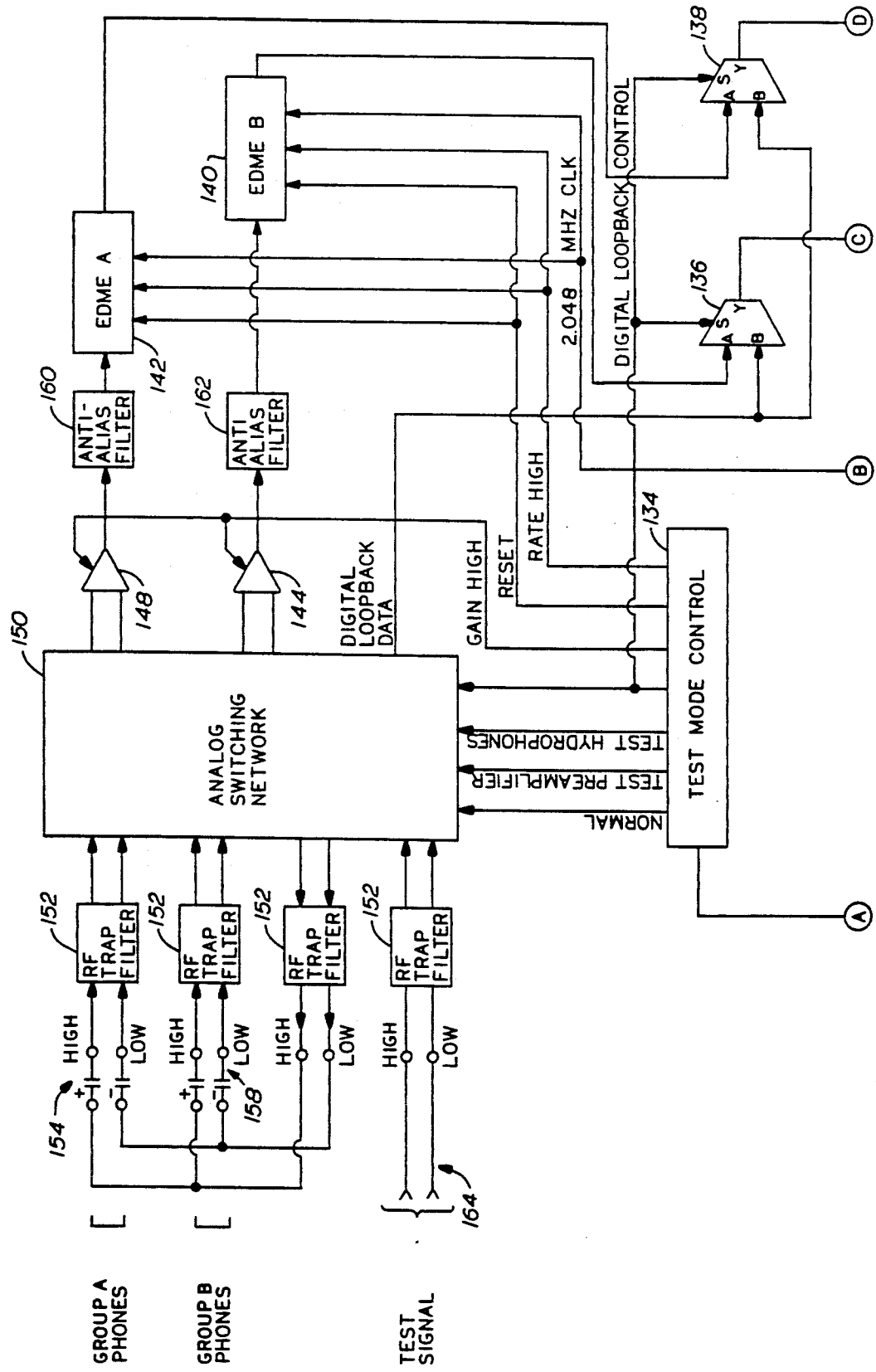
FIGS. 5A and 5B show a more detailed diagram of a distributed unit.
Figure 5B:
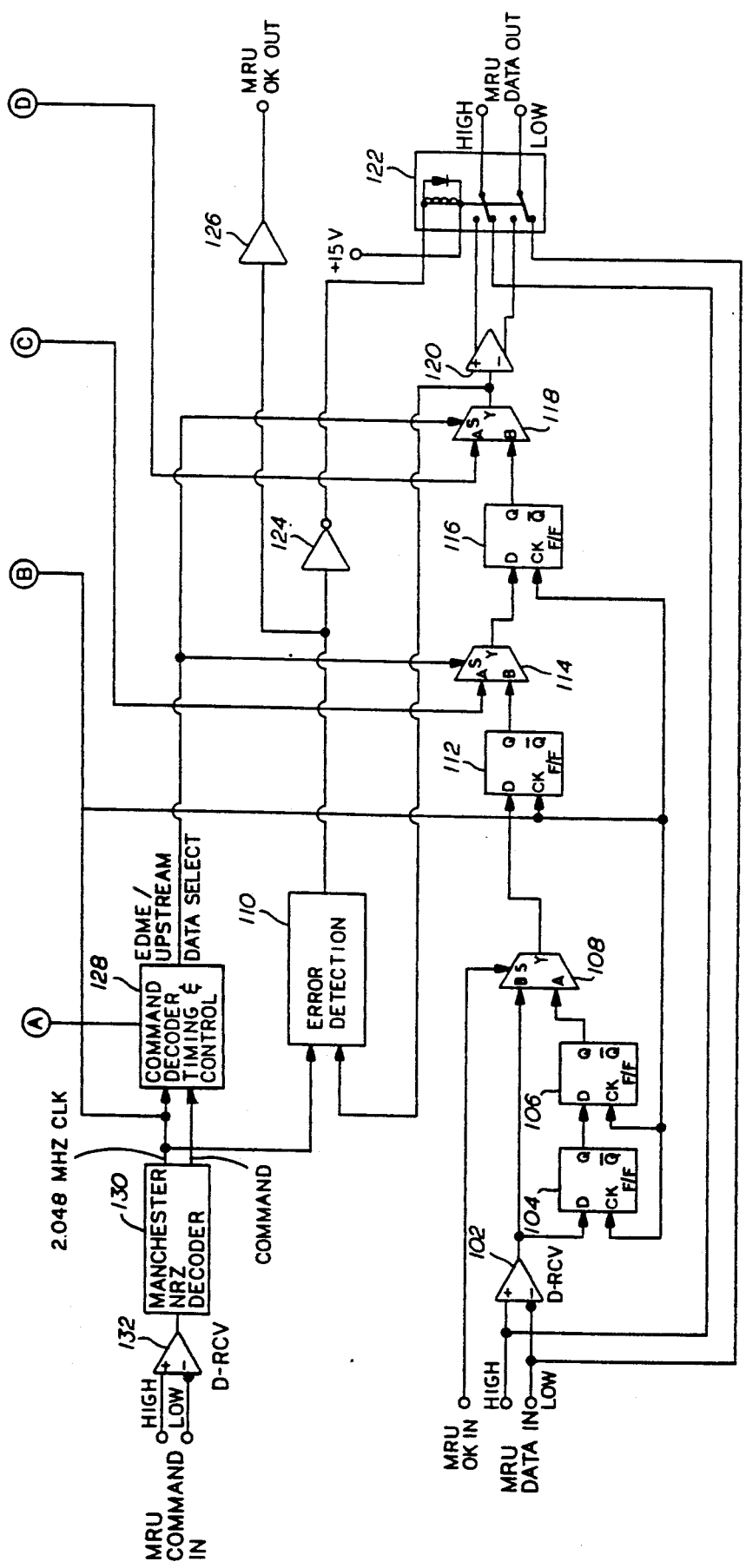

FIG. 4 is a schematic diagram illustrating the interconnection between a module 6 and its associated marine remote units 18a-18h. A schematic of a marine remote unit is shown in FIGS. 5A and 5B. The Test Signal and the MRU Command Signal come from the module and are connected to each of the eight marine remote units in parallel as shown in FIG. 4. The MRU OK Signal and MRU DATA Signal from the marine remote unit most distant from the module is connected to the MRU OK Input terminal and the MRU DATA Input terminal of the adjacent module, and so on. Also shown in FIG. 4 is water-break transducer 7 which may be a hydrophone, the function of which is discussed further hereinafter.

The following is a description of the operation of a marine remote unit (MRU) when all marine remote units are operating properly. Referring to FIGS. 5A and 5B, data from the marine remote unit preceding a given remote unit is applied to the input of digital receiver 102. If the MRU OK IN signal applied to the S terminal of multiplexer 108 indicates that the data from the preceding MRU is valid, then the output from receiver 102, which is applied to the A input of multiplexer 108 is transferred through multiplexer 108, and applied to the D input of flip flop 112. The next clock pulse to flip flop 112 will transfer the signal level applied to the D input of flip flop 112 to the Q output terminal, which is connected to the B input of multiplexer 114. If the input signal applied to the S terminal of multiplexer 114 indicates that upstream data (the data from the preceding marine remote unit) is to be transferred to the output of the multiplexer then the data applied to the B terminal of multiplexer 114 will be transferred to the D terminal of flip flop 116. The following clock pulse will transfer the input to the D terminal to the Q output terminal, which is then connected to the B terminal of multiplexer 118. If the input to the S terminal of multiplexer 118 indicates that the upstream data is to be transferred to the output, the data applied to the B terminal is applied to the output terminal of multiplexer 118 which is then applied to the input of driver circuit 120 which, if the bypass relay 122 is in a closed position will be transferred to the MRU Data Out terminal.

The circuit between the MRU DATA IN terminal and the MRU DATA OUT terminal of a marine remote unit comprises two stages of a shift register. In a preferred embodiment of the invention, eight marine remote units are controlled by each module and the two stages of the shift register in each of the eight modules are connected together, with the MRU DATA OUT terminal from one marine remote unit connected to the MRU DATA IN terminal of the next marine remote unit to form a sixteen stage shift register. As described further herein, the delta modulation encoders 140 and 142 are operated at clock rates of either 64 KHz or 128 KHz. With the clock applied to flip flops 112 and 116 running at 2.048 MHz, each digital output bit from the sixteen delta modulation encoders is clocked through the sixteen stage shift register to the module before the following output bit from the delta modulation encoders is generated.

The Group A hydrophones 154 and Group B hydrophones 158 are each connected through RF trap filters 152 to the input of analog switching network 150. In the normal data gathering mode, the switching network 152 connects the output signal from hydrophone groups A and B to the inputs to preamplifiers 148 and 144, respectively. The output from preamplifier 148 is connected to the input of anti-alias filter 160, the output of which is applied to the enhanced delta modulator encoder 142. The output of preamplifier 144 is applied to the input of anti-alias filter 162, the output of which is applied to the input of enhanced delta modulation encoder 140. The output of enhanced delta modulation encoders 142 and 140 are connected to the input of multiplexers 138 and 136 respectively. The output of multiplexers 138 and 136 are connected to the A input terminal of multiplexers 118 and 114 respectively. In a preferred embodiment of the invention, the Group A hydrophones and Group B hydrophones may each include eight series/parallel connected hydrophones. The preamplifiers incorporate an IF trap and low cut filter of a type typically used in seismic data gathering operations.

Operation of the marine remote unit is governed by the MRU Command In signal which comes from the associated module 6 and is applied to the input of digital receiver 132, the output of which is connected to the input of Manchester/NRZ decoder 130. Manchester/NRZ decoder 130 includes a resonant circuit which responds to the 2.048 MHz bit rate of the MRU Command In signal to generate the 2.048 MHz clock for controlling the timing of the marine remote unit. Decoder 130 also converts the command message to NRZ (Non-Return to Zero) form and applies it to the command decoder timing and control unit 128. The command messages received from the module will include the Interrogate Command and Frame Sync which will control the data transfer from the marine remote unit.

In a particular preferred embodiment, enhanced delta modulation encoders A and B (reference numerals 142 and 140) are operated at a clocking rate of either 64 KHz or 128 KHz. Each of the encoders includes a counter for reducing the 2.048 MHz input clock frequency in binary increments, and means responsive to the Rate High input signal to select either a 64 KHz or a 128 KHz output bit rate. As previously stated, the digital serial data output from modulators A and B are applied to the A input terminals of multiplexers 138 and 136, respectively, which, during the normal data gathering operation, transfer the modulator data to the output terminals thereof. Command decoder timing and control circuit 128 generates an EDME/Upstream Data Select signal which, at the beginning of a data transfer, controls multiplexers 114 and 118 to transfer the EDME output bits to the D input of flip flop 116 and to the MRU DATA OUT terminal, which applies the signal level to the D terminal of flip flop 112 in the succeeding marine remote unit. The first Frame Sync (Frame Sync 0) will transfer the input signal at the D terminal of flip flops 112 and 116 to the Q output terminal, after which the EDME/Upstream Data Select signal changes state to enable multiplexers 114 and 118 to transfer data from the B terminals to the output terminals thereof, so that in response to the following fifteen Frame Syncs (Frame Sync 1 - Frame Sync 15), the output bits from all of the EDMEs in the eight marine remote units will be transferred to the module 6. Data transfer from the marine remote units to the module is continuous in this manner.

When the MRU OK IN signal from the preceding upstream module indicates a malfunction in the preceding module, the signal level applied to the S terminals of multiplexer 108 causes the multiplexer to transfer the data applied to the A input terminal thereof to the output. If an error is detected in a marine remote unit, error detection circuit 110 generates a signal which cause bypass relay 122 to change position so as to bypass data directly from the MRU DATA IN terminal to the MRU DATA OUT terminal. If the preceding module detected such an error, then, in order to maintain correct timing, two additional "0" bits are inserted into the bit stream going to the module in order to compensate for the fact that data from the previous module was connected directly from the MRU DATA IN terminal to the MRU DATA OUT terminal. The two additional "0" bits are inserted by routing the MRU DATA IN signal through the two shift register stages 104 and 106 to the A terminal of multiplexer 108.

Error detection circuit 110 monitors the 2.048 MHz clock and the output of multiplexer 118, and also the voltage level of the marine remote unit power supply (not shown). If no transition is detected in the multiplexer 118 output within a selected number of bit intervals, or if the clock is missing, or if the power supply voltage is too low, error detection circuit 110 generates an output signal which is applied to the inputs of inverting buffer 124 and non-inverting buffer 126, the outputs of which are connected to the bypass relay 122 control terminal and the MRU OK OUT terminal.

If an error is detected, bypass relay 122 then transfers data directly from the MRU DATA IN terminal to the MRU DATA OUT terminal, and the MRU OK OUT signal from buffer 126 controls the succeeding remote unit so that the MRU DATA OUT signal is clocked through flip flops 104 and 106 of the succeeding module so that the valid data bits from the various marine remote units arrive at the module at the same time as they would if no MRU error had been detected.

In addition to the interrogation command, the MRU Command In signal may include commands to test the hydrophones, to test the preamplifiers and for digital loop back testing. Also included are commands to set the clock rate of the enhanced delta modulation encoders, to reset the enhanced delta modulation encoder, and to set the gain of the preamplifiers.

Command decoder timing and control circuit 128 generates one output signal which, as stated above, controls whether upstream data or local data is to be transferred to the MRU DATA OUT terminal. Command decoder timing and control circuit 128 also applies output signals to test mode control circuit 134, which responds to control the various test and programming modes.

The Test Signal input shown applied to input terminals 164 comes from the module. When a Test Hydrophone command is received, the analog switching network 150 responds to the signal from the Test Mode Control circuit 134 to apply the Test Signal, which in this instance will be an analog voltage, to the Group A and Group B hydrophones. The hydrophone output signals are then passed through the RF filters, the analog switching network 150 and the preamplifiers 148 and 144 to the EDMEs. The analog signal is encoded and retransmitted to the module and to the recording and control system 9 on board the towing vessel 2, where the measured amplitude may be compared to the test signal amplitude applied to the hydrophones to determine if the system is operating properly. The marine remote unit responds similarly to the Test Preamplifier command, except that the Test Mode Control Circuit 134 controls the analog switching network 150 to connect the Test Signal directly to the preamplifiers 148 and 144. In each analog signal test mode, the Test Signal is DC coupled into the system element to be tested, which increases the accuracy of the test.

In the Digital Loopback Control mode, the Test Signal applied to terminal 164 will consist of digital data bits. In this mode analog switching network 150 will supply the digital Test Signal (digital loopback data) to the B terminals of multiplexers 136 and !38, and the digital loopback control signal from test mode control circuit 134 is applied to the S terminal of multiplexers 136 and 138 so that the Test Signal digital data (digital loopback data) is transferred to the output of the multiplexers. By utilizing the three different test modes, it can be determined whether a problem is originating in the hydrophones, in the preamplifier and encoder portion, or in the digital portion of the marine remote unit.

In a preferred embodiment of the invention, a module is installed every 100 meters, at the shipside end of each cable section. As previously stated, command signals are transmitted on a single twisted-pair conductor from the towing vessel. As also previously stated, digital data is transmitted from the modules back to the boat on five optical fiber data paths, with data from every fifth module applied to a given transmission path, so that there is a 500 meter spacing between modules which apply data to a particular path.

During data acquisition, recording and control system 9 will transmit a basic scan which will include six interrogation commands transmitted during a one-half millisecond time period. In response to the detection of each interrogation command, a module transmits three data words, or channels, of information. In a preferred embodiment of the invention, each word includes 24 data bits and a parity bit is added after each data word. Three bits of framing precede and follow the data words for a total of 81 bits. At a data bit rate of 16.384 Mbits/second, eighty one bits of data and framing are placed in the data line in approximately five microseconds. As stated previously, the interrogation command is retransmitted and received by each succeeding module. The fifth module from any given module will transmit its own eighty one bits of data and framing onto the same optical fiber as the given module. The time lapse between the retransmission of an interrogation command from one module until receipt of the seismic data from the fifth module is about 5.6 microseconds [(2×5 ns/m×505 m) +610 ns] which leaves a separation of about 0.6 microseconds between each 5 microsecond burst of data on an optical fiber. The preceding formula was based on a two-way transmission time and an estimated conductor length of 505 meters in a 500 meter cable length. The interrogation command is delayed by one-period of an 8 MHz sampling clock, or 122 nanoseconds in each module, which yields the 610 ns delay for five modules.

Figure 8:
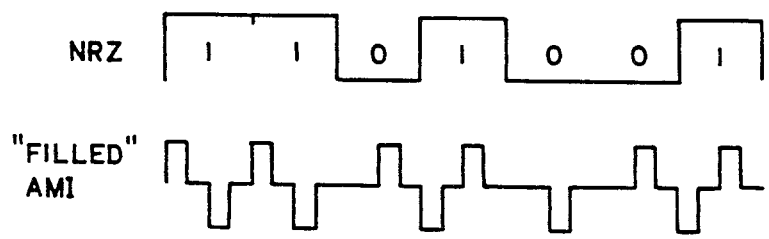
FIG. 8 shows a comparison between the form of NRZ (nonreturn to zero) data and AMI (alternate mark invert) data.
Figure 7:
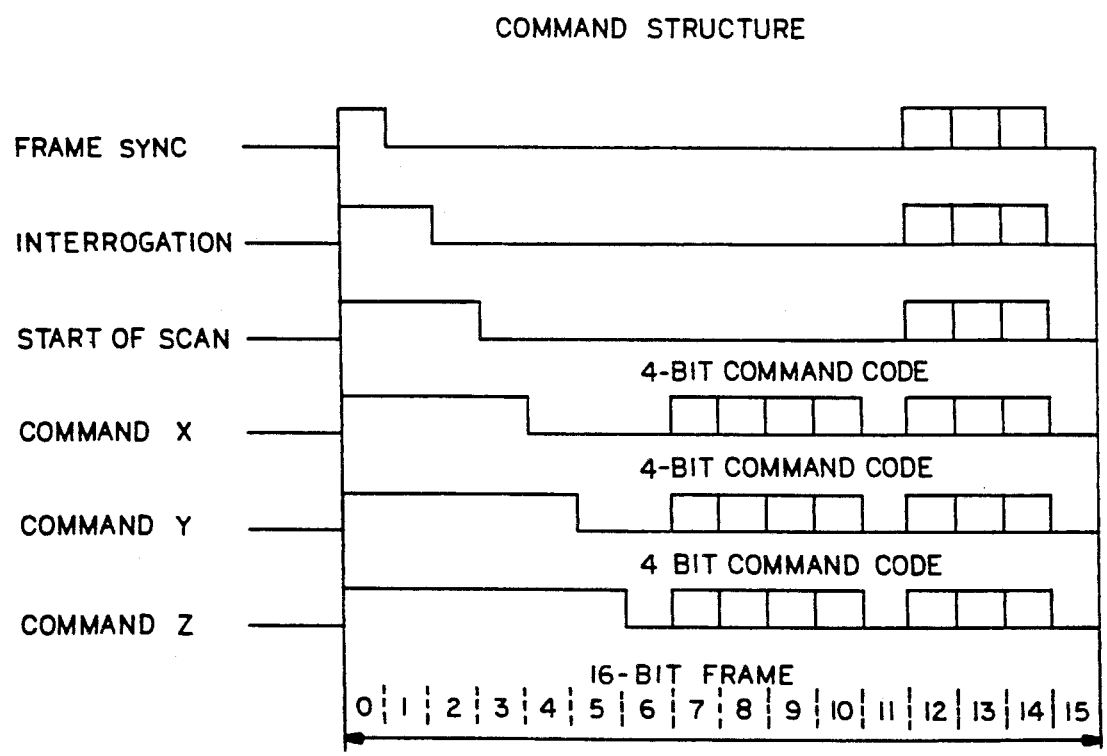
Figure 8:
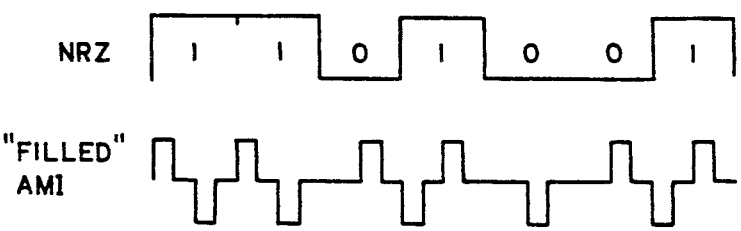

In order to utilize delta modulation encoders, the entire cable system is operated in time synchronization. In contrast to successive approximation encoders which may be operated intermittently and asynchronously, delta modulation encoders operate continuously. As is well known to those of ordinary skill in the art, a delta modulation encoder encodes an analog input signal as a single bit digital output. Typically, the single bit output stream is applied to the input of a FIR (finite impulse response) filter which converts the single bit stream to multibit output words at a lower (decimated) frequency rate. The digital output signal of the encoder is transferred to the FIR filter and out of the FIR filter at a synchronized rate. System synchronization is achieved by continuous transmission, from the recording and control system 9, of a command signal which includes a clocking signal. The combination of a clocking and command signal is achieved by utilizing an AMI (Alternate Mark Invert) signal. The comparison between an NRZ and an AMI signal pattern is shown in FIG. 8. In an AMI signal, "0" bits are represented by a zero signal level and "1" bits are generated by a non-zero level during the first half of a bit interval. As shown in FIG. 8, a "1" bit is generated by alternately generating a plus signal or a negative signal. Phase-lock loop circuit 59 included in each module 6 locks onto the command signal and generates harmonics and subharmonics of the bit rate frequency ranging from 64 KHz to 65.536 MHz.

In a particular preferred embodiment of the invention, a bit rate of 4.096 MHz is utilized for transmitting the command signals. The bits of the command signal are transmitted at a bit rate of 2.048 MHz, but a "1" bit is inserted between each bit of the Command signal as a "filler" to increase the number of "1" bits in the AMI signal.

Figure 7:
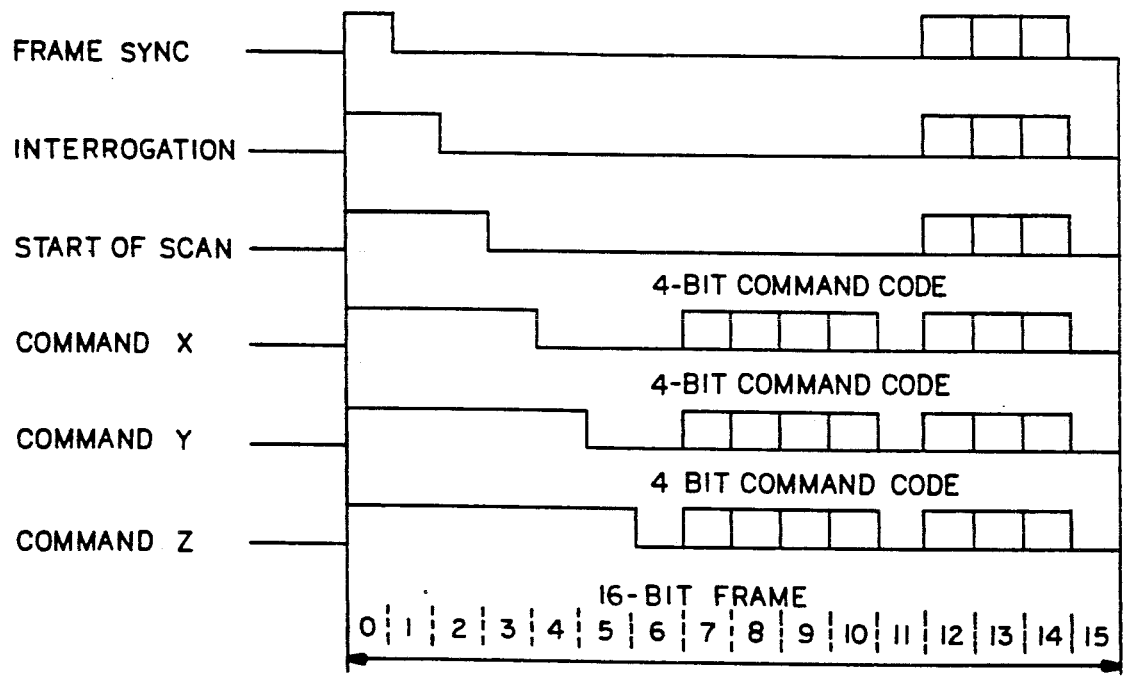
FIG. 7 shows the pattern of command words which may be utilized.

In a particular preferred embodiment, Command signals are transmitted to the modules in a sixteen bit format as illustrated in FIG. 7. As shown in FIG. 7, the first bit of each sixteen bit frame is a "1" bit (frame sync pulse), and the type of command is determined by the number of successive "1" bits at the beginning of the frame. A Frame Sync signal has only a single "1" bit at the beginning of the frame. An Interrogation signal begins with two "1" bits. A Start of Scan signal begins with three "1" bits and a Command X, Command Y and Command Z signal begins respectively with four, five and six "1" bits. Each frame may optionally include one or two EDMD bits in bit positions 14 and 15 of the frame, the function of which will be discussed hereinafter. The Command X, Command Y and Command Z signals will have a four-bit command code positioned in bit positions 8-11. To simplify the illustration, the alternate filler "1" bits which are inserted into each command or interrogation are not shown in FIG. 7.

The duration of each command signal frame is 7.812 microseconds, so that the bit rate is 2.048 MHz and the frame rate is 128 KHz.

In a particular preferred embodiment, the Command X signals may be as follows:

|  | Bit 8 | Bit 9 | Bit 10 | Bit 11 |
| --- | --- | --- | --- | --- |
| Select Normal Interrogation Pulse Delay | 0 | 0 | — | — |
| Select 488 Nanoseconds Interrogation Pulse Delay | 0 | 1 | — | — |
| Select 976 Nanoseconds Interrogation Pulse Delay | 1 | 0 | — | — |
| Select Interrogation Pulse Blocking | 1 | 1 | — | — |
| Select EDME Rate 64 KHz | — | — | 0 | 0 |
| Select EDME Rate 128 KHz | — | — | 1 | 0 |
| Select MRU Preamp Gain Low | — | — | — | 0 |
| Select MRU Preamp Gain High | — | — | — | 1 |
| Command Y signals may be as follows: |  |  |  |  |
| Reset FIR and EDME | 1 | — | 0 | 1 |
| Bump-a-long Strobe | 1 | — | 1 | 0 |
| Bump-a-long Reset | 1 | — | 1 | 1 |
| Bump-a-long Set | 1 | — | 0 | 0 |
| Disable Data Assembler | 0 | 0 | — | — |
| Enable Data Assembler | 0 | 1 | — | — |

Figure 6A:
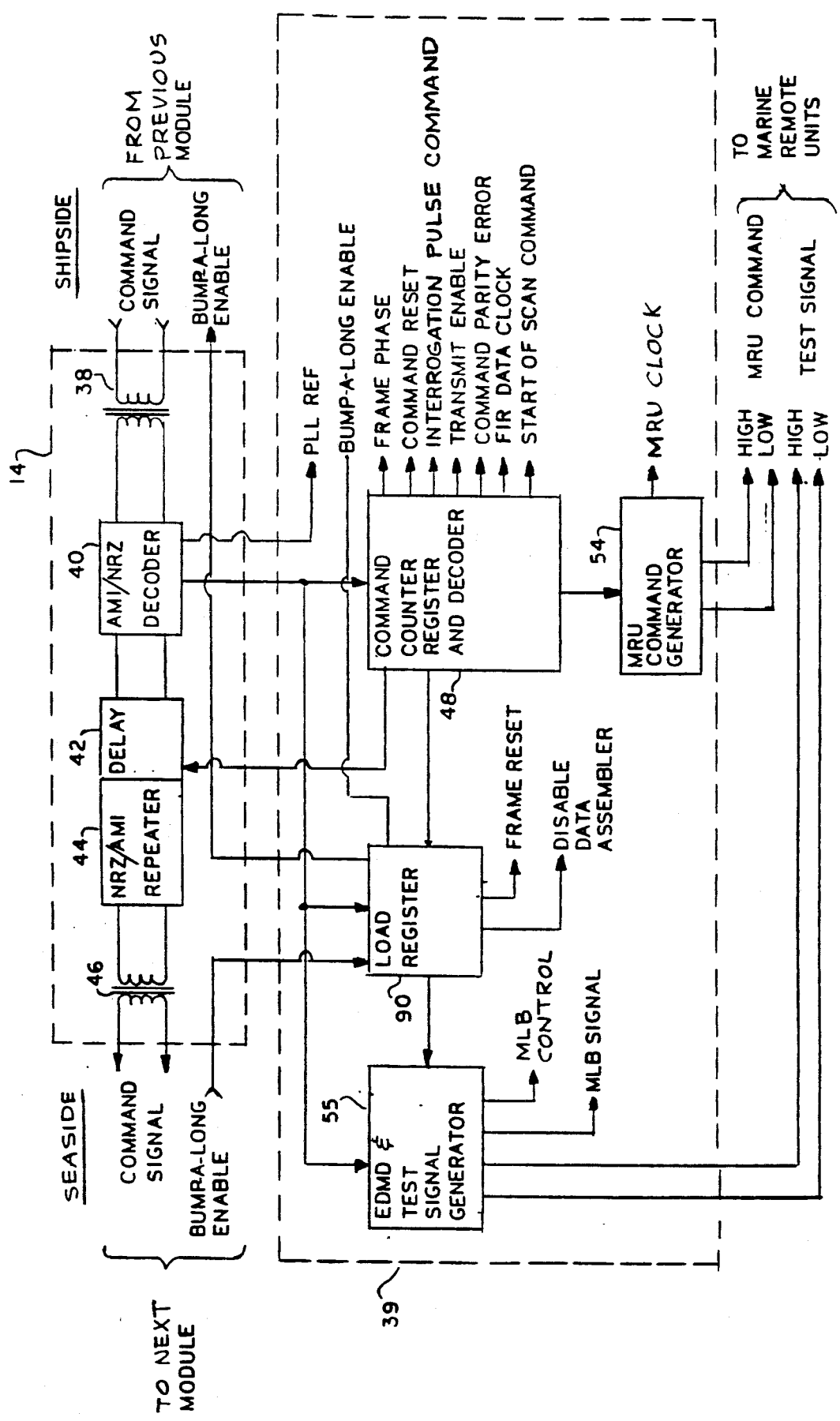
Figure 6C:
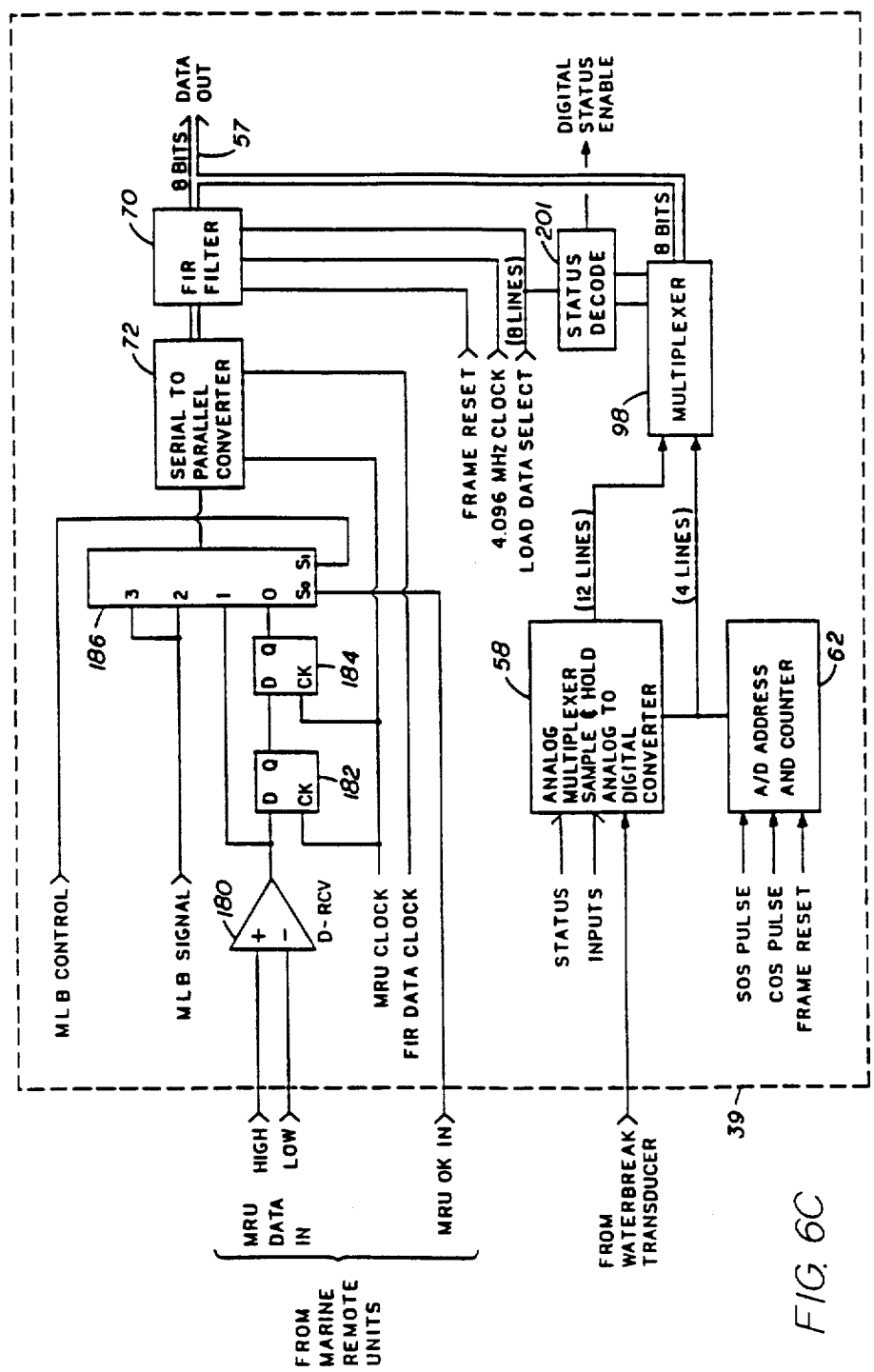

FIGS. 6A, 6B and 6C show the module electronics. As shown in FIG. 6A, the command signals from the vessel are applied to transformer 38, the output of which is applied to AMI/NRZ Decoder 40. The command signals are transmitted in AMI (Alternate Mark Invert) format, a format in which alternate one bits are transmitted as a minus voltage. The command signals are delayed by a selected amount in delay circuit 42, then applied to an NRZ/AMI repeater 44, the output of which is applied to transformer 46 and then transmitted to the next module along the cable.

The output from AMI/NRZ decoder 40 is applied to the input to the command counter register and decoder circuit 48 which decodes the command signals. Referring to FIG. 6C, the seismic data from the eight marine remote units (MRUs) 18a–18h associated with a module are applied serially to the input of differential receiver 180. The output of differential receiver 180 is applied to the D input of flip flop 182 and the "1" input to multiplexer 186. Flip flops 182 and 184, and multiplexer 186 are interconnected in a manner analogous to flip flops 104 and 106 and multiplexer 108 of FIG. 3B. The MRU OK signal from b2 the marine remote unit closest to the module is applied to the S$_o$ terminal of multiplexer 186 so that if the MRU OK signal indicates that the marine remote unit has a fault and that the two stages of the shift register (flip flops 112 and 116) in the marine remote unit have been bypassed, the MRU Data In is clocked through flip flops 182 and 184 to add the correct spacing back into the data transfer. If no fault condition is indicated in the preceding marine remote unit, the MRU Data In from the differential receiver 180 output, applied to the "1" terminal of multiplexer 186, is transferred directly from differential receiver 180 through the multiplexer 186 to the serial to parallel converter 72.

Serial-to-parallel converter 72 converts the MRU Data In into parallel form. In a preferred embodiment of the invention, digital data from the marine remote units are generated in single bit format by a delta modulation encoder. In a preferred embodiment, a single bit of data from each of the sixteen hydrophone arrays in the eight marine remote units arrive sequentially at the MRU Data In terminal, followed sequentially by a second bit from each of the sixteen hydrophone arrays. Serial to parallel converter 72 includes two 16-bit registers. The MRU clock signal clocks the serial output data from the multiplexer 186 into a 16-bit shift register within serial to parallel converter 72. The FIR Data Clock then transfers the 16 bits in parallel from the shift register into a second 16 bit register which applies the sixteen bits in parallel to the input to the FIR filter. Data from each hydrophone channel arrives at the FIR Filter at a 128 KHz bit rate. If the delta modulation encoder is operating at a 64 KHz bit rate, in a particular embodiment, each 16-bit sequence is transmitted twice, but the second transmission is ignored. The FIR filter 70 includes a digital finite impulse response antialias filter and, by selecting every sixty-fourth sample, decimates each channel to a word rate of either 1 or 2 words per millisecond, as selected, with each output data word including 24 bits. In a particular preferred embodiment, the FIR filter contains 448 coefficients of 24-bit precision. The FIR (Finite Impulse Response) circuit is a circuit well known to those of ordinary skill in the art and functions in this embodiment to convert a single bit digital output signal from the delta modulation encoder into binary coded PCM (pulse code modulation) words.

The output of the FIR filter is applied, by means of bus 57, to the input to the data assembler and control circuit 56 shown in FIG. 6B. In addition to the seismic data, the status of various conditions in the module may be sampled and such data transmitted back to the shipboard recording system, along with the seismic data. FIG. 6C shows module status input signals and the output from water-break transducer 7 applied to the input of analog multiplexer, sample and hold, and analog to digital (A/D) converter system 58. The output of system 58 is connected to multiplexer 98, the output of which is connected to bus 57 along with the output from the FIR filter 70. The status input signals may include power supply voltage levels and other operating information of interest.

Each twenty-four bit FIR filter output word is transferred to the eight bit bus 57 as three 8-bit bytes. The digital output from circuit 58 is in the form of 12-bit words. The eight most significant bits of the 12-bit words are applied to a first set of input terminals of multiplexer 98, and the four least significant bits of the 12-bit word are applied to a second set of input terminals of multiplexer 98 along with 4 bits from A/D Address and Counter circuit 62 which will provide the indication as to which of the status input signals to circuit 58 has been encoded and applied to the output thereof.

Control signals for circuit 58 are derived from Analog to Digital Address and Counter Circuit 62, which responds to the SOS (Start of Scan) Pulse, the COS (Center of Scan) Pulse, and the Frame Reset signal to generate timing for the analog multiplexer, sample and hold, and the analog to digital converter.

The Load Data Select Signal from Data Assembler and Control Circuit 56 (see FIG. 6B) comprising seven bit, parallel input control words controls the timing of FIR filter 70. The Load Data Select Signal is also applied to Status Decode Circuit 201, which generates output signals to control the transfer of data through multiplexer 98, and to control the transfer of data to the output of Parity Check and Status Register 60. (See FIG. 6B). Also shown applied to FIR Filter 70 is the Frame Reset signal and the 4.096 MHz clock.

Referring to FIG. 6B, the upstream seismic data arriving at a particular module 6 from the other modules which are further away from the towing vessel are applied to the input of optical to electrical converter 10, the output of which is applied to data repeater circuit 64. Each twenty-four bit data word arriving at a module will have a parity bit added thereto.

The Data Repeater Circuit 64 regenerates the incoming digital data and applies the regenerated data (SDATREP) to an input of AND gate 94 and to an input to Parity Check and Status Register Circuit 60. The incoming data will consist of data bursts of 81 bits each, including three 24-bit data words with a parity bit following each data word along with three frame bits (1,0,1) preceding the data and three frame bits trailing the data (0,0,0). The Data Repeater circuit detects the incoming data and generates a Parity Clock Pulse at the time of occurrence of each parity bit. The Data Repeater also monitors the incoming data and computes a parity bit value designated as SDRP (Serial Data Repeater Parity) based on the detected bit values of the incoming data. The Parity Clock Pulse and the Serial Data Repeater Parity (SDRP) are also applied to input terminals to the Parity Check and Status Register 60.

Parity Check and Status Register 60 includes circuits to compare each calculated parity bit SDRP with the corresponding parity bit detected in the incoming data. Each time there is a discrepancy between the computed parity bit and detected parity bit, a 4-bit register in the Parity Check and Status Register is incremented, which permits a count of up to fifteen parity errors to be accumulated.

The output from the Parity Check and Status Register onto bus 57 includes the 4-bit output from the parity counter, the command parity error bit, and three additional bits which may be utilized as needed in any particular implementation of the invention. The Digital Status Enable signal from Status Decode Circuit 201 enables Parity Check and Status Register 60 to apply its 8-bit output to bus 57.

Data Assembler and Control Circuit 56 controls the transfer of the seismic data and status data from bus 57 to an input to AND gate 96. Data Assembler and Control Circuit 56 responds to the Interrogation Pulse Command, Start of Scan Command, Command Reset and Frame Reset to convert the data back to a serial format, to add a parity bit to each data word, add framing and apply the data to the input to AND gate 96.

Multiplexer 74 is controlled so as to transfer either the upstream data from AND gate 94 (SDATREP) or the locally generated data from the output of Data Assembler and Control Circuit 56 to optical driver 12 for transmission to the next module. When the Transmit Enable signal goes to a true state, multiplexer 74 is enabled to transfer the locally generated data from the B input terminal thereof to the Y output terminal. When Transmit Enable is at a not true state, multiplexer 74 is enabled to transfer upstream data from the output of AND gate 94.

The Data Repeater Disable signal is applied to the input to AND gate 94 to selectively inhibit transfer of upstream data. The Bump-a-long Enable Signal and the Data Assembler Disable signal are applied to AND gate 96, so that either of the two signals may selectively inhibit transfer of locally generated data. Data Repeater Disable signal is generated by data repeater circuit 64 in response to the Transmit Enable signal. The Data Repeater Disable signal blocks any spurious signal that may appear at the output of data repeater 64 during the time that local data transmission is enabled.

SOS/COS Pulse Generator Circuit 92 responds to the Transmit Enable, Frame Phase, SOS Command and the most significant bit of the Load Data Select Signal to generate an SOS (Start of Scan) Pulse at the beginning of a data scan and a COS (Center of Scan) Pulse at the center of a data scan.

Also shown in FIG. 6B is the voltage controlled oscillator 59, which is a phase locked loop circuit which responds to the PLL reference signal from AMI/NRZ Decoder Circuit 40. Voltage Controlled Oscillator circuit 59 generates clock frequencies from 2.048 MHz to 65.536 MHz.

Referring again to FIG. 6A, the output signal from the AMI/NRZ Decoder 40, which comprises the decoded command words, is applied to the load registers circuit 90 and the EDMD and Test Signal Generator Circuit 55, as well as to the Command Counter Register and Decoder Circuit 48.

Command Counter Register and Decoder circuit 48 detects the presence of the X, Y and Z commands and directs the Load Register Circuit 90 to load the command into designated registers. Load Register Circuit 90 then applies these commands to EDMD and Test Signal Generator Circuit 55. EDMD & Test Signal Generator 55 includes a demodulator which may comprise an enhanced delta modulation decoder. The decoder may be the EDMD device which may be obtained from Martin-Marietta, Aero and Naval Systems Ocean Systems Operations Division. Each of the command words from AMI/NRZ Decoder 40 may include a Test Signal bit. In a particular embodiment, this Test Signal bit occupies bit position 14 and 15 of a Command word. Each Test Signal bit is detected and applied to the decoder included in EDMD & Test Signal Generator 55. The EDMD bits will arrive at the module at a 128 KHz bit rate, the pattern of which corresponds to that of an EDME (enhanced delta modulation encoder) analog to digital converter output. The EDMD Test Signal Generator circuit 55 responds to the command output signals from the Load Registers 90, to determine whether to apply the digital Test Signal bits from the Command words directly to the Test Signal output to the marine remote units or to the MLB signal output, or whether to apply to the EDMD analog output signal to the Test Signal output. The MLB CNT (Module Loop Back Control) and MLB SIG (Module Loop Back Signal) are utilized for testing only the module circuitry. The MLB CNT is applied to the $S_1$ terminal of multiplexer 186 (see FIG. 6C) and MLB SIG is applied to the input terminals 2 and 3 of multiplexer 186. In the Module Loop Back test mode, the digital Test Signal bits decoded by the EDMD and Test Signal Generator Circuit 55 from the command words are transferred through multiplexer 186, processed through the FIR filter and transmitted back to the vessel to provide a test of the module electronics.

An output signal from the Command Counter Register and Decoder Circuit 48 is applied to the MRU Command Generator 54, which generates the MRU Command signal which is transmitted to the marine remote units. The EDMD and Test Signal Generator 55 generates the Test Signal output which is transmitted to the marine remote units.

Other signals generated by the command counter register and decoder 48 and load registers 90 are as follows:

Frame Phase — a set of synchronizing signals generated synchronously with receipt of a frame sync pulse of a command signal frame.

Command Reset — a reset signal generated at power turn on or upon detection of four missing frame sync pulses.

Interrogation Pulse Command — generated upon detection of an interrogation command.

Transmit Enable — generated upon receipt of an interrogation command. Enables transmission of local data.

FIR Data Clock — a 64 KHz or 128 KHz clock, selectable to match the delta modulation bit rate.

Start of Scan Command — generated every 64 frames in response to receipt of a Start of Scan command at a one millisecond rate to ensure data channels are sampled at correct time.

Frame Reset — a signal included in one of the load Y commands which resets and synchronizes the analog circuits (EDMEs, FIR Filters).

Data Assembler Disable — a Y command which disables the transmission of local data.

At the beginning of data retrieval from the cable, a Start of Scan command will be transmitted from recording and control system 9. In a particular preferred embodiment of the invention, a Start of Scan command will be followed by three Frame Sync frames. Then, an Interrogation command followed by nine Frame Sync words is repeated six times to complete a basic scan, which, at a frame rate of 128 KHz, requires one-half millisecond. Depending on whether data is desired at a one or one-half millisecond sample rate, the basic scan will occur once per millisecond or once per half-millisecond. Three channels of information are sent in response to each Interrogation command. Sixteen of the channels are data from the sixteen hydrophone arrays and two are for status data. If data is generated at a half-millisecond sample interval, the enhanced delta modulation encoders in the marine remote units are operated at a clock rate of 128 KHz. If data is generated at a one millisecond sample rate, the enhanced delta modulation encoders in the marine remote units are operated at a clock rate of 64 KHz. In either mode, data is transmitted from the module to the ship at the same bit rate, but if data is sampled at a one-millisecond sample rate, no data is transmitted to the vessel during the one-half millisecond interval when no interrogation pulses are transmitted. This mode of operation enables data to be obtained from a second cable if dual cable operations are being performed.

As stated previously, delay circuit 42 will normally insert a delay of 122 nanoseconds in each module in the retransmission of the Command Signal to the succeeding module. By use of the appropriate Command X signal, delay circuit 42 may be programmed to insert an additional delay of either 488 nanoseconds or 976 nanoseconds, instead of 122 nanoseconds. Use of 488 nanoseconds delay permits use of 50 meter cable sections in place of 100 meter sections. Use of the 976 nanoseconds delay permits the module to be connected directly together for testing without any cable section being connected between the modules. An output signal from command decoder register and decoder circuit 48 controls the delay circuit 42 so that the desired amount of delay is inserted.

A Command X code (Command Blocking) may be utilized to block re-transmission of further command signals. Following transmission of such a command from recording and control system 9, any further command signals will be received only by the module closest to the vessel. The first module may be re-enabled to transmit command signals by transmission of either a Select Normal Interrogation Pulse Delay, a Select 488 Nanoseconds Interrogation Pulse Delay, or a Select 976 Nanosecond Interrogation Pulse Delay Command. After the first module is reenabled to retransmit commands, the first and second modules may receive commands, and the second module and subsequent modules may then be similarly reenabled, one module at a time.

Other Command X signals are utilized to select Enhanced Delta Modulation Encoder bit rates of either 64 KHz or 128 KHz, and to set the marine remote unit preamplifier gains at either a low gain or a high gain. In a preferred embodiment, the low gain is −6.02dB and the high gain is +6.02dB. The low gain position is sufficient to run the FIR filter to full scale with approximately 100 millibars RMS pressure level.

The Command Y signals include the Reset FIR and EDME command which is normally transmitted at the beginning of a data gathering operation to synchronize the EDMEs and the FIRs. The Bump-a-long Strobe, Bump-a-long Reset and Bump-a-long Set commands are utilized to selectively enable or disable data retrieval from selected modules. Included in the load register circuit 90 in each module is a bump-a-long enable flip-flop which may be clocked, set or reset. A Bump-a-long Reset command will "reset" the flip-flop in each module. The Bump-a-long Enable output signal from Load Registers 90 to the input of AND gate 96 (see FIG. 6B) will then inhibit the transfer of locally generated data through AND gate 96 and thereby inhibit the transfer of local data from the module. In this mode, upstream data from data repeater circuit 64 may still be transferred through AND gate 94 and multiplexer 74, but transfer of local data from the module itself is inhibited. A Bump-a-long Set Command will set the bump-a-long enable flip flops in each module and reenable all modules to generate and transfer data normally. A Bump-a-long Strobe Command causes a clock pulse to be applied to the bump-a-long enable flip flop in each module, which causes the flip flop in each module to take on the value of the flip flop in the preceding seaside module.

The bump-a-long enable flip flop output level from each module is applied to the D input control terminal of the bump-along enable flip flop in the next module starting with the module most distant from the ship. The Bump-a-long Strobe Command causes a clock pulse to be applied to each bump-a-long enable flip flop, which results in the transfer of the signal level applied to the D terminal of the flip flop to the output thereof.

In a preferred embodiment, the Command Z signals control various testing operations. As shown in FIG. 5, an EDMD Test Signal Bit may be included in bit positions 14 or 15 of the 16 Bit Command Word. These bit positions are utilized to transmit a digital code to the module having the bit pattern of the output of a delta modulation encoder. In a particular preferred embodiment, the transmitted bits may be duplicated in bit positions 14 and 15. These bit positions may also be utilized to transmit time-series values of a two-valued signal. Command signals are transmitted to the modules at a frame rate which is equal to the bit rate at which the enhanced delta modulation encoders in the marine remote units generate output bits. Bit values appearing in bits 14 and 15, representing the output of a delta modulation encoder, are applied to a delta modulation decoder in EDMD & Test Signal Generator 55 to reconstruct the corresponding analog signal. This delta modulation decoder consists essentially of a low-pass filter. Depending on the test mode selected either the digital Test Signal digital bits or the decoded analog signal is applied to the Test Signal output terminal of the module. With four bit positions (bits 8, 9, 10 and 11) available, up to 16 different Z Command test modes may be selected. As discussed with reference to FIG. 3, the test signal may be connected to the hydrophones or to the input of the preamplifiers with the hydrophones disconnected, or the digital circuits and FIR filter may be checked by looping back the test signal rather than sampling the output of the enhanced delta modulation encoder. Command Z signals may include the following:

| | Bit 8 | Bit 9 | Bit 10 | Bit 11 |
|---|---|---|---|---|
| Normal Acquisition | 0 | 0 | 0 | 0 |
| Analog loopback of test signal with hydrophones disconnected | 0 | 0 | 0 | 1 |
| Analog loopback of test signal with hydrophones connected | 0 | 1 | 0 | 0 |
| Digital loopback of test signal | 1 | 0 | 0 | 1 |

The Command Y signals include a Disable Data Assembler and Enable Data Assembler Command. When a Disable Data Assembler command is received, the load registers 90 will generate a signal which is applied to an input to AND gate 96 to inhibit the transfer of locally generated data through the AND gate. An Enable Data Assembler command will reenable transfer of data from each module to the module data output. Use of the Disable Data Assembler and Enable Data Assembler commands is useful in conjunction with the Bump-a-long commands. The Bump-a-long Strobe command permits data retrieval to be initiated one module at a time starting at the module furtherest from the towing vessel in order to test for possible malfunctions. Use of the Disable Data Assembler permits data transfer from all modules to be inhibited at a time when the Bump-a-long Strobe command has enabled a portion of the modules to transmit data, and Enable Data Assembler can then reenable the modules previously enabled by the Bump-a-long Strobe command with a single command.

Additional test modes may also be utilized. For example, an attenuation may be included in the analog switching network circuit 150 so that the two analog loop back test modes may be utilized with a low level input signal. An impulse signal may also be applied in the two analog loop back test modes to test the response of the hydrophones and the preamplifier to an impulse signal.

Also included in each module is waterbreak detection means. In marine cables, it is typical to include a hydrophone for detecting the time of the seismic source impulse in the water. This signal is detected by waterbreak detection transducer 7 and encoded by multiplexer, sample and hold, and A/D converter system 58 and transmitted to ship in the third data word position responsive to the third interrogation of a scan cycle. Various other module status conditions, which may include the power supply voltage levels, cable depth, and temperature, may be encoded and transmitted in the third word position responsive to the sixth interrogation of a scan cycle.

The command signal from the recording and control system 9 has a parity bit which may be in bit position 12 and based on bit positions one through eleven. Command counter register and decoder circuit 48 checks for parity errors and if an error is detected, a Command Parity Error signal connected to parity check and status register 60 will indicate an error which is then input as a status bit to bus 57.

In the preferred embodiment described herein, a single cable may be any length from 100 meters to 6000 meters, configured by adding sections in 100-meter increments. The system may also be utilized with multiple cables. When utilizing the timing scheme of the particular preferred embodiment described herein up to four separate cables may be utilized. For example, during a basic scan, six interrogation commands are transmitted down the cable within a one-half millisecond interval. A basic scan may be repeated during the succeeding one-half millisecond, or alternatively, a second cable may be utilized, and a basic scan, including six interrogation commands may be utilized to retrieve data from the second cable during the second one-half millisecond.

In the preferred embodiment described herein, interrogation commands are transmitted at ten frame intervals (every 78.125 microseconds). Provided the cables are no more than about 3000 meters in length, interrogation commands may be transmitted on the second cable at a time offset of five frames from the interrogation command transmissions on the first cable, and the seismic data bursts returning from the cables will arrive at the central recording unit in a time multiplex manner without overlapping of the data. Alternatively, a set of six interrogation commands may be transmitted o the first cable at ten frame intervals followed by the transmission of six interrogation commands at ten frame intervals on the second cable. Data may then be retrieved from two cables of up to about 6000 meters in length, but at a sampling interval of one millisecond. By using a combination of the two methods, up to four cables may be utilized, with a set of six interrogation commands being transmitted on each of a first two of the cables at a time offset of five frames, followed by the transmission of sets of six interrogation commands on the third and fourth cable, with the transmissions also being offset by five frames. In this manner, data may be retrieved from up to four cables at a one millisecond sampling interval.

While the invention has been described with a reference to a preferred embodiment, it will be obvious to one skilled in the art that modifications and variations of the invention may be constructed and employed without departing from the scope of the invention. The scope of the invention is defined in the following claims.

We claim:

1. A marine seismic data acquisition system comprising:
   a marine seismic cable adapted to be towed behind a vessel, said cable including a plurality of substantially identical sections;
   a plurality of seismic sensors positioned along the length of each cable section;
   a module included in each section adapted to receive seismic data from a plurality of said seismic sensors in a section and apply said seismic data in digital form to a transmission path;
   a plurality of transmission paths extending along the length of said cable for transmitting data from said modules to a recording station and a single command transmission path extending along the length of said cable for transmitting interrogation commands to each of said modules from said recording station; and
   each module being connected to apply the seismic data from a cable section to a single transmission path in response to an interrogation command from said recording station, with successive modules along the length of the cable being connected to said plurality of transmission paths in a successively repetitive pattern.

2. The apparatus of claim 1 wherein said plurality of transmission paths comprises five paths.

3. The apparatus of claim 2 wherein said plurality of transmission path comprise optical fiber transmission paths.

4. The apparatus of claim 1 wherein said plurality of transmission paths comprise optical fiber transmission paths.

5. The apparatus of claim 1 wherein the signals detected by said seismic sensors are converted to digital form by delta modulation encoders.

6. The apparatus of claim 5, wherein said modules are adapted to receive the seismic data transmitted from modules which are connected to apply seismic data to the same transmission path to which the receiving module is connected and which are located more distant from the central recording unit than the receiving module and to retransmit such received seismic data and transmit local seismic data along said same transmission path to the central recording unit.

7. The apparatus of claim 6, further comprising a single command transmission path for transmitting command signals from said central recording unit to said modules; and
   said modules being spaced a selected distance apart to enable time division multiplexed transmission of seismic data on said data transmission paths in response to detection of an interrogation command signal transmitted from said central recording unit on said command transmission path.

8. The apparatus of claim 7 wherein the number of data transmission paths in equal to the whole number "n" and the modules are connected along at least a portion of said cable to said data transmission paths so that each "n"th module is connected to a given one of said transmission paths, said modules being positioned at selected locations along said cable and adapted to respond to a signal from a central recording unit for time division multiplexing of seismic data transmission of seismic data to said central recording unit on each of said "n" transmission paths.

9. A method of synchronizing a marine seismic cable data acquisition system which includes a plurality of data formatting and transmission modules distributed along said cable and a plurality of remote units associated with each data formatting and transmission module, comprising:

continuously transmitting a first signal from a central recording unit to said data formatting and transmission modules which first signal combines a clock and command signals within the same signal pattern;

detecting said first signal in each of said data formatting and transmission modules and retransmitting said first signal to a data formatting and transmission module more distant from said central recording unit;

selecting the distance between data formatting and transmission module and the time delay between reception and retransmission of said first signal to enable time multiplexing of data transmission from said data formatting and transmission modules to said central recording unit;

continuously transmitting a second signal from each of said data formatting and transmission modules to the plurality of remote units associated with each said data formatting and transmission module, said second signal including a second clock synchronized to the first said clock;

generating digital seismic data in said remote units synchronously with said second clock;

transferring digital data from said remote units to said formatting and transmission modules synchronously with said second clock; and formatting and transmitting said digital data from said formatting and transmission modules to said central recording unit synchronously with said first clock.

10. Apparatus for assembling data in a section of a seismic cable comprising:

a data formatting and transmission module;

a plurality of remote units distributed along said section;

said module including means for generating a module clock synchronized to a first clock signal received from a central recording unit, and for transmitting a second clock signal to said remote units synchronized to said module clock;

each of said plurality of remote units including means for generating a remote unit clock synchronized to said second clock signal; an analog to digital converter means for converting detected seismic signals to digital data; and at least one storage register for receiving the digital data from the analog to digital converter means; and said storage registers being interconnected to form a single shift register extending through said plurality of remote units and having an output connected to said module for transferring digital data from each of said plurality of remote units to said module, with the storage registers in each individual remote unit being clocked by the remote unit clock generated in the individual remote unit.

11. The apparatus of claim 10 wherein each said analog to digital converter means comprises a delta modulation encoder.

12. The apparatus of claim 10 wherein each said analog to digital converter means comprises a delta modulation encoder and each said remote unit includes two of said encoders, and said shift register comprises two shift register stages in each remote unit.

13. The apparatus of claim 12 further comprising error detection means in at least one of said remote units for detecting a malfunction and means responsive to said error detection means for inhibiting the transfer of data from the delta modulation encoder in the remote unit in which the error was detected to said data formatting and transmission unit.

14. The apparatus of claim 13 further comprising means for generating an error signal indicating the detection of an error and means responsive to the error signal for adding position filling data to the shift register in place of the data from the delta modulation encoders.

15. The apparatus of claim 12 wherein said second clock signal provides for synchronous operation of said delta modulation encoders and said shift register.

16. The apparatus of claim 14 wherein said data formatting and transmission module comprises a FIR (finite impulse response) filter responsive to said digital data from said delta modulation encoders for decimating said digital data.

17. A method for assembling data in a section of a seismic cable for transmission to a central recording unit; comprising:

generating in a data formatting and transmission module a module clock synchronized to a first clock signal received from a central recording unit and transmitting a second clock signal synchronized to said first clock signal to a plurality of remote units;

generating in said remote units a remote unit clock synchronized to said second clock signal;

converting detected seismic signals to digital data and receiving the digital in storage registers in said remote units;

transferring the digital data from each of said plurality of remote units to said module by interconnecting said storage registers to form a single shift register extending through said plurality of remote units to said module and clocking said storage registers in each individual remote unit with the remote unit clock generated in the individual remote unit.

18. The method of claim 17 further comprising:
sensing malfunctions in said remote units; and
inhibiting the transfer of digital data to said data formatting and transmission module from a remote unit in which a malfunction is sensed.

19. The method of claim 17 wherein said detected seismic signals are converted to digital data by delta modulation encoders, and each said remote unit includes two of said encoders.

20. The method of claim 19 wherein two of said storage means are included in each distributed unit to form said shift register.

21. The method of claim 20 further comprising detecting malfunctions in at least one of said remote units and inhibiting the transfer of data from the delta modulation encoders in the remote unit in which a malfunction is detected to said data formatting and transmission module.

22. The method of claim 21 further comprising generating an error signal indicating the detection of a malfunction and adding position filling data to the shift register in place of the data from the delta modulation encoders in response to said error signal.

23. The method of claim 22 wherein said second clock signal supplied to each of said remote units provides for synchronous operation of said delta modulation encoders and said shift register.

24. The method of claim 17 wherein said shift register is distributed across a distance of about 100 meters.

25. The method of claim 17 further comprising processing said digital data with a FIR (finite impulse response) filter to decimate said digital data from said delta modulation encoders.

26. A method for testing a marine seismic data acquisition system comprising a marine seismic cable adapted to be towed behind a vessel and a plurality of seismic data acquisition modules positioned along the length of said cable comprising:
- disabling the transmission of locally generated data from all data acquisition modules in response to a first command signal transmitted over a first transmission path from a central recording unit;
- enabling the transmission of locally generated data from a selected data acquisition module in response to a second command signal transmitted over said first transmission path;
- interrogating the seismic data acquisition modules by transmitting an interrogation command over said first transmission path to obtain locally generated data from said selected data acquisition module for evaluation;
- successively enabling seismic data acquisition modules positioned successively along said cable to transmit locally generated seismic data by successive transmissions of said second command signal over said first transmission path; and
- interrogating the data acquisition modules following selective transmissions of said second command signal by transmitting an interrogation command over said first transmission path to obtain locally generated data from the enabled seismic data acquisition modules for evaluation.

27. A marine seismic data acquisition system, comprising:
- a marine seismic cable adapted to be towed behind a vessel;
- a plurality of seismic data acquisition modules positioned along the length of said cable, each said module comprising;
- means for receiving data from a data acquisition module located more distant from a central recording unit and for retransmitting said received data along said seismic cable toward the central recording unit;
- means for transmitting local data from the module along with the retransmitted data so that said retransmitted data and said local data comprise a substantially continuous transmission of data;
- means responsive to a first command signal transmitted from said central recording unit along a first transmission path for disabling transmission of local data; and
- means responsive to a second command signal transmitted from said central recording unit along said first transmission path and to the presence of a first control signal from a previously enabled module for enabling transmission of local data from the data acquisition module and for applying a first control signal to another data acquisition module.

28. A seismic data gathering system including a cable having a plurality of substantially identical modules positioned at selected locations along the length thereof for processing and formatting seismic data and transmitting seismic data to a central recording unit, comprising:
- means in each module for receiving upstream seismic data from a module located at an upstream position from the receiving module and for retransmitting said upstream seismic data downstream;
- means in each module for transmitting locally generated seismic data downstream;
- means in each module responsive to a single transmission of a first command signal from said central recording unit along a first transmission path for inhibiting the transmission of locally generated data without inhibiting the transmission of upstream data;
- means in each module responsive to a first control signal from an upstream module and a second command signal transmitted from said central recording unit along said first transmission path for enabling said module to transmit locally generated seismic data and apply a first control signal to a downstream module, one said module being enabled thereby to transmit locally generated data in response to each successive transmission of said second command signal; and
- means in each module responsive to a single transmission of a third command signal from said central recording unit along said first transmission path for enabling transmission of locally generated seismic data from each module in response to a single transmission of said third command signal.

29. Apparatus according to claim 25 further comprising: means in each module responsive to a single transmission of a fourth command signal from said central recording unit for inhibiting transmission of locally generated seismic data; and
- means in each module responsive to a single transmission of a fifth command signal for re-enabling transmission of locally generated seismic data only from modules from which transmission of locally generated data has been previously enabled in response to a transmission of a second command signal.

30. Apparatus according to claim 29 wherein each module of said cable is substantially identical and the module most distant from said central recording unit is adapted to respond to receipt of a second command signal so as to always enable transmission of locally generated data without the presence of said first control signal from an upstream module.

31. The apparatus of claim 30 wherein said cable includes a plurality of paths for transmitting seismic data to said central recording unit and a plurality of modules connected to transmit seismic data on each path and the positions of the modules along the cable are interleaved with respect to the path they are connected to.

32. A seismic data gathering system including a cable having a plurality of substantially identical modules positioned at selected locations along the length thereof for processing and formatting seismic data and transmitting seismic data to a central recording unit, comprising:
- means in each module for receiving commands from a first transmission path and for retransmitting the received commands along said cable along said first transmission path to a module positioned in a donwstream location:
- means responsive to a first command received from said first transmission path for disabling the retransmission of subsequently received commands; and
- means responsive to a second command received from said first transmission path for re-enabling the retransmission of subsequently received commands, whereby following transmission of said first command only the module located nearest to said central recording station is able to receive commands and one additional module is enabled to receive commands following transmission of each second command.

* * * * *

UNITED STATES PATENT AND TRADEMARK OFFICE
CERTIFICATE OF CORRECTION

PATENT NO. : 5,058,080

DATED : Oct. 15, 1991

INVENTOR(S) : Lee E. Siems; Marvin K. Amerine; Loring C. Chien; William P. Vorheier It is certified that error appears in the above-identified patent and that said Letters Patent is hereby corrected as shown below:

IN THE FIGURES

Delete Drawing Sheet 9 of 9, and substitute therefore the drawing sheet consisting of Fig. 6c as shown on the attached sheet.

Signed and Sealed this

Twentieth Day of July, 1993

Attest:

MICHAEL K. KIRK

Attesting Officer

Acting Commissioner of Patents and Trademarks